United States Patent [19]
Mowatt et al.

[11] Patent Number: 4,706,406
[45] Date of Patent: Nov. 17, 1987

[54] ANIMAL TRAP

[76] Inventors: Harry C. Mowatt, R.R. #3, Truro, Greenfield, Colchester County, Nova Scotia, Canada, B2N 5B2; Alfred T. MacDonnell, R.R. #1, Elmsdale, Hants County, Nova Scotia, Canada, B0N 1M0; George T. Clark, R.R. #3, Brookfield, Colchester County, Nova Scotia, Canada, B0N 1C0

[21] Appl. No.: 873,733

[22] Filed: Jun. 11, 1986

[30] Foreign Application Priority Data

Jun. 19, 1985 [CA] Canada ................ 484551

[51] Int. Cl.$^4$ .......................... A01M 23/16
[52] U.S. Cl. ................................ 43/61; 43/60
[58] Field of Search .............. 43/60, 61, 62; 160/332

[56] References Cited

U.S. PATENT DOCUMENTS

| | | | |
|---|---|---|---|
| 1,367,928 | 2/1921 | Stolp | 160/332 X |
| 2,611,989 | 9/1952 | Larson | 43/61 |
| 2,692,453 | 10/1954 | Wingfield | 43/61 |
| 3,174,250 | 3/1965 | Gilbert | 43/61 |
| 3,200,534 | 8/1965 | Wood et al. | 43/61 |
| 3,624,951 | 12/1971 | Gilbaugh | 43/61 |
| 3,834,063 | 9/1974 | Souza et al. | 43/61 |
| 4,080,749 | 3/1978 | Gilbaugh | 43/61 |

FOREIGN PATENT DOCUMENTS

| | | | |
|---|---|---|---|
| 57755 | 10/1897 | Canada . | |
| 98628 | 4/1906 | Canada . | |
| 233031 | 7/1923 | Canada . | |
| 233455 | 8/1923 | Canada . | |
| 271672 | 6/1927 | Canada . | |
| 332628 | 5/1933 | Canada . | |
| 377754 | 11/1938 | Canada . | |
| 18871 | 8/1928 | Netherlands | 160/332 |
| 277556 | 12/1951 | Switzerland | 160/332 |

*Primary Examiner*—Nicholas P. Godici
*Assistant Examiner*—Carmine Cuda
*Attorney, Agent, or Firm*—Beveridge, DeGrandi & Weilacher

[57] ABSTRACT

A humane animal trap is provided in the form of a cage having two end openings which can be closed by flexible drop gates when an animal has entered. Each of the drop gates comprises a series of horizontal bars slidable on vertical guide rods, with spacer chains connected between the bars. Latches are provided for holding the drop gates normally raised, and tripper means within the cage release both of the latches simultaneously when an animal has entered. A lock mechanism is provided which prevents the animal lifting the drop gate. The top of the trap can be made of flexible wire mesh, so that the trap can be submerged just below the water level but can still allow an animal to breathe by lifting up the top mesh.

6 Claims, 7 Drawing Figures

ANIMAL TRAP

The present invention provides a trap for animals of the humane kind, i.e. an enclosing trap in the form of a cage which holds the animal without harming it. The trap can be used on many different kinds of animals, including birds, but is primarily designed for underwater use as a trap for beavers or otters. For this latter purpose the trap may be set so as to be just submerged, but is provided with a flexible top which can be lifted by the trapped animal to allow it to breathe. The trap preferably has a perch on which the animal can rest in a raised position with its head above the water.

One feature of the trap is that the closure means do not project above the top of the trap, allowing concealment of the trap just under the water level. Another feature is that no springs are required, the tripper mechanism and closure means operating entirely by gravity. A special lock means is provided so that there is virtually no chance of a trapped animal escaping.

The trap according to the invention comprises a cage having a bottom, side walls and a top, and closure means at opposite ends, at least one of the end closure means being in the form of a flexible drop gate including horizontal bars slidable on vertical guide rods and spacer means connected between the bars to regulate their spacing. Latch means holds the drop gate normally raised, and tripper means within the cage allows the latch means to drop the gate when an animal has entered the cage and touched the tripper means.

Preferably, a lock mechanism is provided which prevents lifting of the gate by an animal trapped in the cage. This lock mechanism includes at least one apertured locking element sliding on a guide rod, this element being slidable up the guide rod when lifted by hand but having an off-set connection to the gate such that jamming occurs if an attempt is made to raise the gate without also raising the locking element.

The invention also provides a special tripper mechanism, linked to the latch means to release this when touched by an animal. For this purpose the tripper means is attached to a rotatable shaft, on which rests an end of a longitudinally movable rod providing a link to the latch means. The tripper mechanism is set by placing the end of the rod against the shaft and as soon as an animal touches the tripper means the shaft is rotated and the rod moves off the shaft so that it is free to move longitudinally and allows release of the latch.

Preferably, similar drop gates are used at both ends of the cage, and a central tripper mechanism operates both of the drop gates simultaneously.

The invention will now be described in detail with reference to the accompanying drawings, in which.

Figure 1:
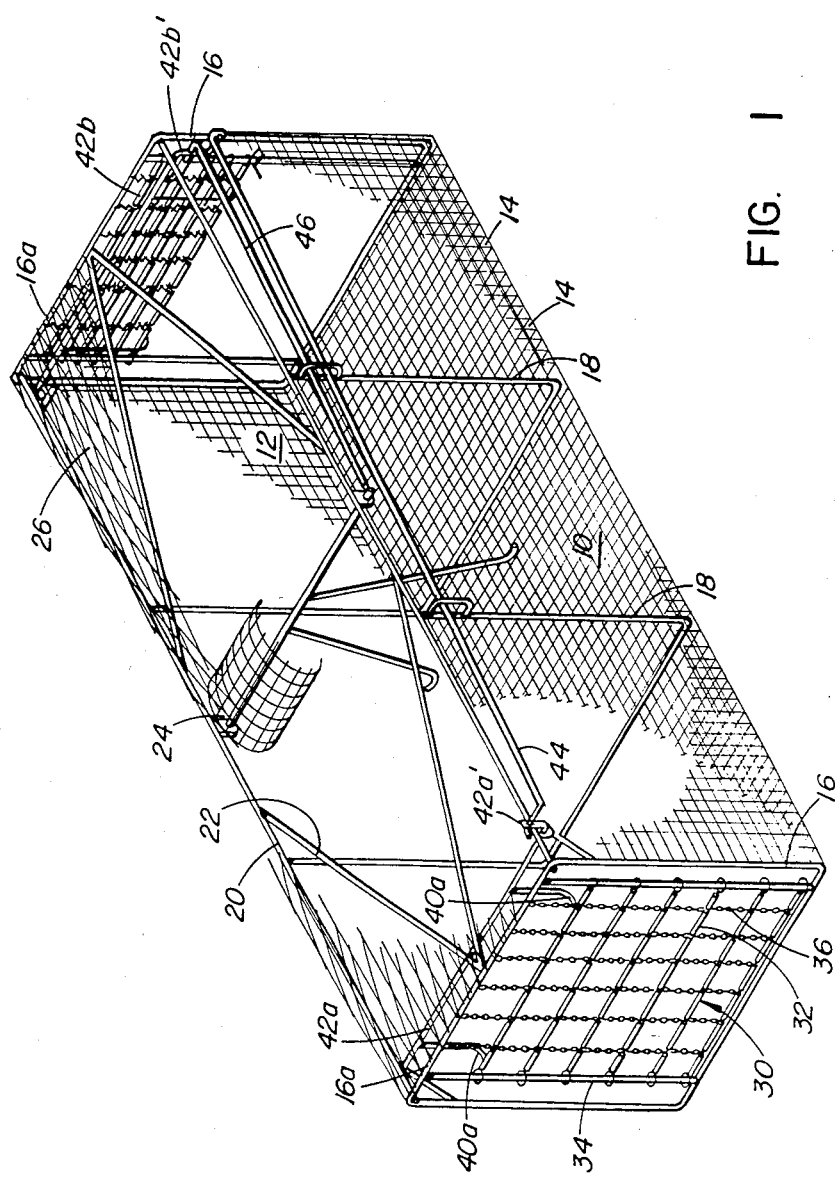
FIG. 1 shows a perspective view of the trap.

The trap as shown in FIG. 1 has a bottom 10 and side walls 12 formed of welded wire mesh 14 held by a framework of rods including rods forming closed rectangular end frames 16 and intermediate frames 18 also rectangular but open at the top. Longitudinal rods 20 are welded to the top portions of frames 18 and to the upper corners of the frames 16. Bracing rods 22 connect the centres of the upper rods 16a of the end frames and the central portions of rods 20. A perch 24 in the form of an elongated, transversely curved mesh member is provided extending across the cage at its longitudinal centre and near to its top. The top of the cage is provided with a loose flexible top formed of chain links, this being such that it can be raised by an animal several inches. With this arrangement the trap having the mesh top resting on the rods 22 and perch 24 can be concealed entirely under water, but an animal trapped in the cage can lift the mesh top sufficiently above the water to allow it to breathe. The perch 24 is provided so that the animal can rest with its head above the water.

Figure 2:
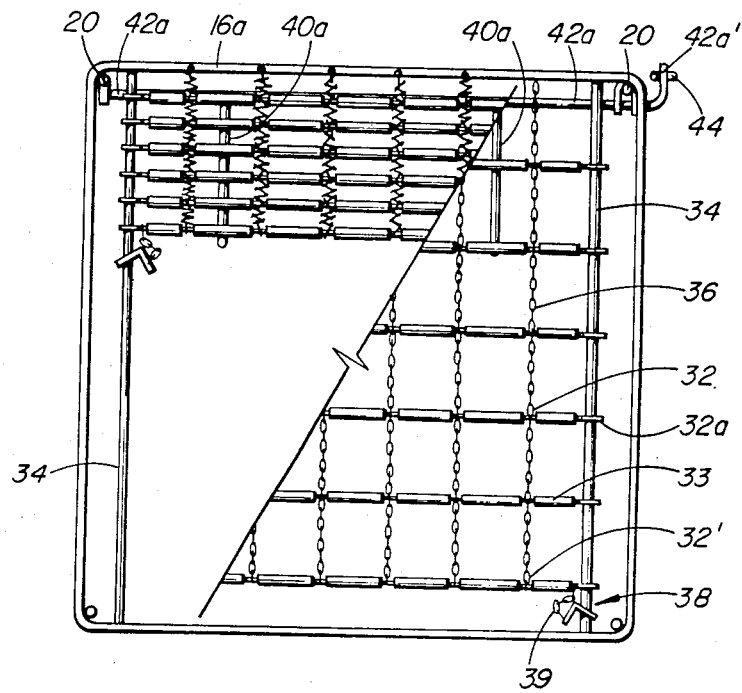
FIG. 2 shows a view on an end of the trap showing a drop gate, the left hand portion of this figure showing the gate raised and the right hand portion showing the gate lowered.

The otherwise open end frames 16 are closeable by drop gates 30 which are the same at each end of the trap. As particularly shown in FIG. 2, each drop gate includes a series of six horizontal bars 32 having at their ends eyes 32a which are freely slidable on the vertical guide rods 34. A series of chains 36 (for example six chains) has each an upper end connected to the upper rod 16a of the end frame, and a lower end connected to the lowermost horizontal bar 32', being connected at intermediate portions to the various horizontal bars and being held apart by spacers 33 on the bars. The result of the arrangement is that when the gate is dropped, as shown in FIG. 1 and in the right hand side of FIG. 2, a grid formed of horizontal bars and vertical chains is provided which prevents an animal escaping. The chains are such that a safety margin is provided below the bottom of the lowermost bar 32' so that this will not injure the animal's tail or foot as the gate drops.

Figure 2A:
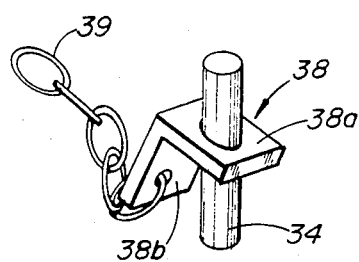
FIG. 2A shows a diagrammatic view of a lock mechanism for the gate.

The lowermost rod 32' of each drop gate has associated with each of its ends a lock mechanism which is best illustrated in FIG. 2A. This comprises an angle element 38 having a first portion 38a with an aperture which is slidable on the guide rod 34, and a second portion 38b which is angled downwardly from portion 38a. Portion 38b is connected by a short chain 39 to the end portion of the rod 32'. The arrangement is such that while the element 38 can readily be lifted by hand, if an attempt is made to raise the gate by lifting on the bar 32' or on the chains, the off-set connection between the chain 39 and the element causes this to jam on the guide rod so that the gate cannot be lifted.

Figure 3:
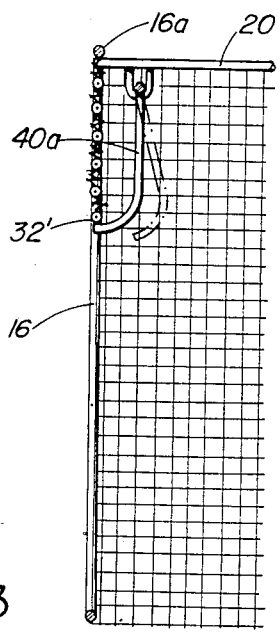
FIG. 3 shows a fragmentary sectional elevation through one end of the trap, and illustrating the latch and drop gate in the raised position.
Figure 4:
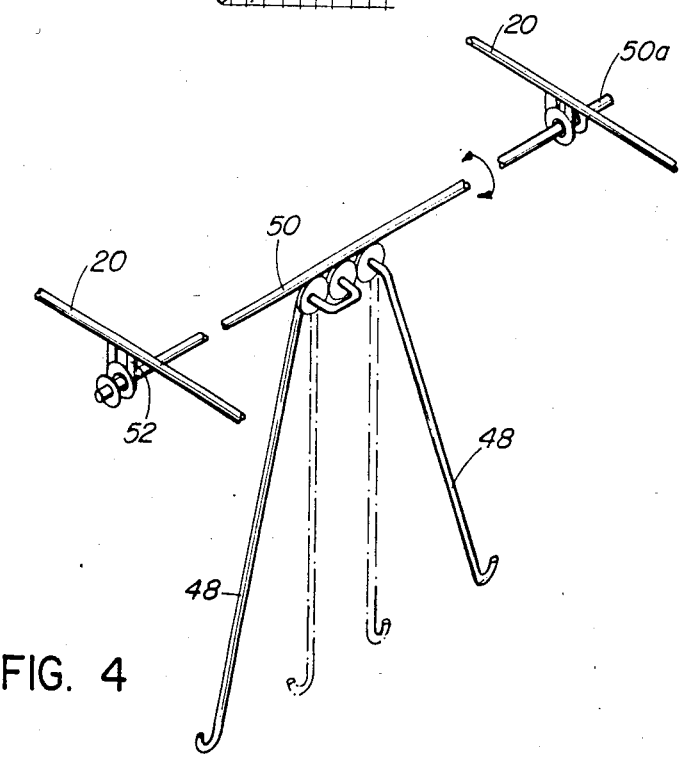
FIG. 4 shows a detail of the tripper means.
Figures 5, 5A:
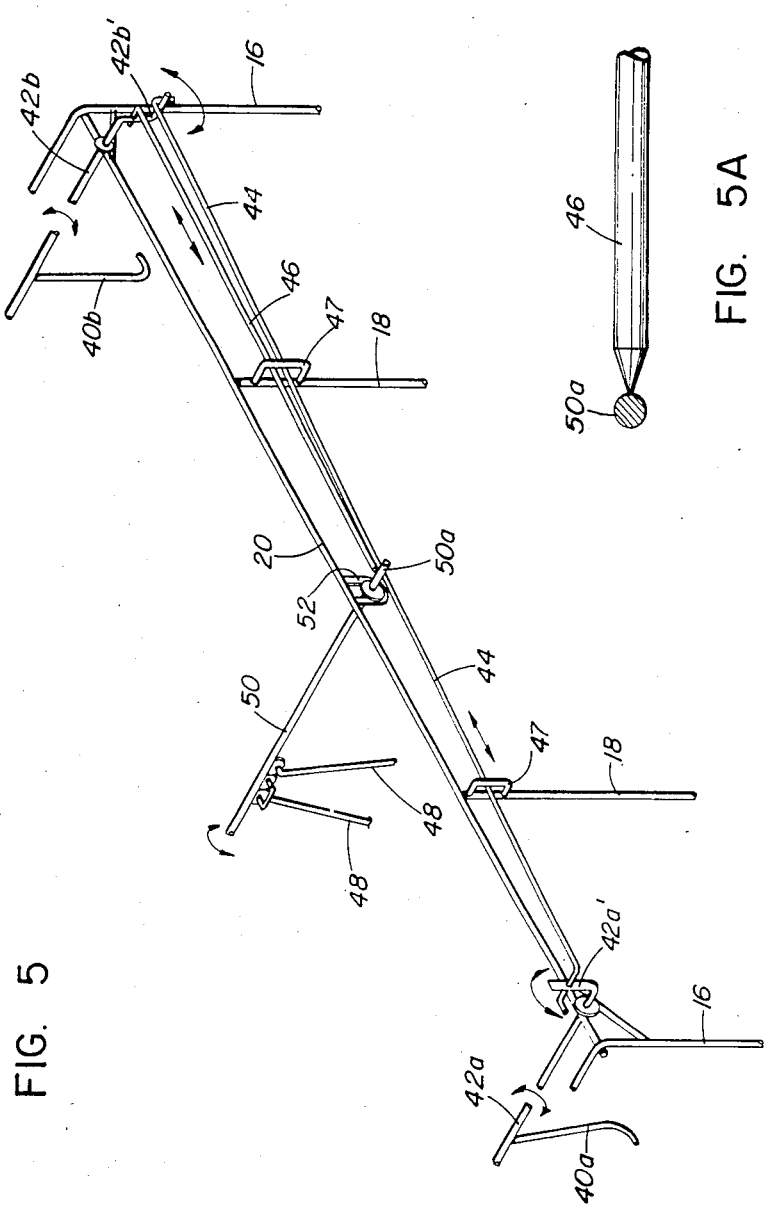
FIG. 5 shows a diagrammatic view of the elements of the tripping device and the latch means.
FIG. 5A shows a fragmentary view of a portion of the tripping means.

When the trap is set, the drop gates are held in raised position, at opposite ends of the trap respectively, by the latches 40a and 40b which are hook-like elements welded to transverse rods 42a and 42b respectively. The rod 42a has a crank portion 42a' extending upwardly and just outside the side of the cage, and the rod 42b has a similar but downwardly extending crank portion 42b'; these are best shown in FIG. 5. The crank portion 42a' is connected by means of a link 44 to the crank portion 42b', and the latter crank portion is also connected to a rod 46 which is part of a tripping mechanism at the centre of the cage; rods 44 and 46 pass through retaining loops 47 on the framework. The tripping mechanism includes two trip wires 48 welded to and depending downwardly from a rotatable shaft 50, which extends across the centre of the top of the trap and which is held by brackets 52 welded below the centres of the longitudinal rods 20. The rod 50 has an extension 50a projecting beyond the bracket 52 on one side of the cage, and this has a small depression which can receive the pointed end of the rod 46 as shown in FIGS. 5 and 5A. When the trip wires are hanging vertically, the rod 46 can be held as shown, at roughly the mid height of the shaft 50a, and in this position rod 46 holds the shaft 42b in such position that the latches 40b retain the associated end gate in the raised position as shown in FIG. 3. Similarly, the rod 44 which is connected to the crank 42b' holds the shaft 42a in such position that the latches 40a hold the associated drop gate raised. When an animal touches the trip wires 48 and slightly rotates the shaft 50, the rod 46 falls off this shaft and allows the shaft 42b, and consequently also the shaft 42a, to rotate in such direction as to release the gates from the latches. The gates then drop by gravity. The latches are such that the gates urge the latches to the release position, and there are no springs necessary in the tripping mechanism.

The splayed apart tripper wires as shown are suitable for large animals such as beavers, but an additional set of wires at a smaller spacing may be used where it is intended to trap otters.

In use for trapping beavers or otters, the trap (which is non-buoyant) is placed on a generally level surface so that the top is just below water level; this makes the trap difficult to see. The trap is set with the two end gates raised and held by the latches 40a and 40b, and with the rod 46 resting on shaft 50 as indicated in FIG. 5A. An animal entering the trap from either end and touching the trip wires will rotate the shaft 50 slightly causing the rod 46 to come free of this, and the shafts 42a and 42b will then rotate slightly with the latches releasing both of the end gates simultaneously. The lock devices 38 prevent the animal from lifting the end gates. Assuming that the level of the trap is suitable, the animal can breathe by lifting the top mesh 26 with its head, resting if necessary on the perch 24.

For trapping land animals, the same trap can be used or the trap may be modified by having the flexible mesh top replaced by a rigid mesh.

Bait for animals such as wildcats and racoons may be placed on the tripper wires, and for birds, seeds may be placed on the bottom of the trap. No bait is needed for beaver and otter as the trap is set in the waterways.

It will be appreciated that it is not necessary for the trap to be double ended, and a single ended trap can be used with the closure means as described for one end and simple fixed closure means at the other end.

We claim:

1. A trap for animals comprising a cage having a bottom, side walls and a top and closure means at its opposite ends, at least one end closure means being in the form of a flexible drop gate including horizontal bars slidable on vertical guide rods and spacer means connected between said bars to regulate their spacing, and having latch means for holding the drop gate normally raised, tripper means within the cage being connected to said latch means to allow the gate to drop when an animal has entered the cage and touched the tripper means, and wherein a lock mechanism is provided which prevents lifting of the gate by an animal trapped in the cage, said lock mechanism including an apertured element sliding on a guide rod, said element being slidable up the guide rod when lifted by hand but having an off-set connection to the gate such that jamming occurs if an attempt is made to raise the gate without also raising the element.

2. A trap according to claim 1 wherein said spacer means includes chains connected between said bars.

3. A trap according to claim 1, wherein said latch means is linked to said tripping means by a longitudinally movable rod having an end portion which normally rests against a shaft rotatable by the tripper means, said rod being released from engagement with the shaft when the latter is rotated by movement of the tripper means and being then movable to allow the latch to release the gate.

4. A trap according to claim 3, wherein the tripper means includes wires depending from said shaft.

5. A trap according to claim 1 wherein both of said closure means are in the form of flexible drop gates each having at least one latch for holding the gate normally raised, the tripper means being located centrally in the cage between the two drop gates.

6. A trap according to claim 1 wherein said top is in the form of a flexible netting which can be lifted by a trapped animal such that the trap may be set under water but may allow the animal to breathe by lifting the top, a perch being provided for the animal raised above the bottom of the trap.

* * * * *